E. P. JONES.
ROCK DRILL OPERATING MECHANISM.
APPLICATION FILED NOV. 1, 1918.
1,314,811. Patented Sept. 2, 1919.
3 SHEETS—SHEET 3.
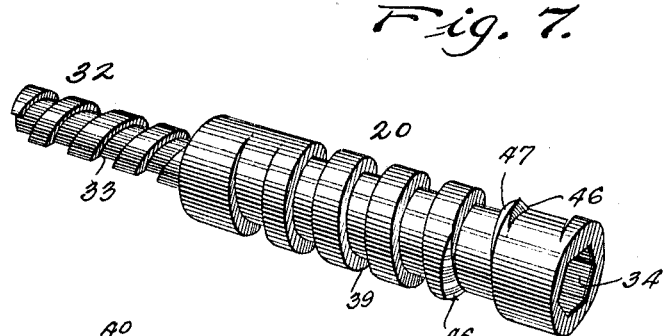
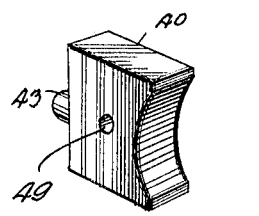
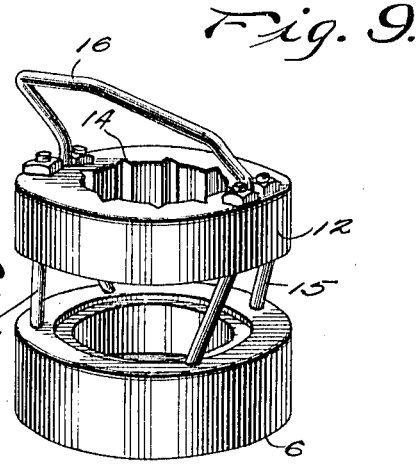
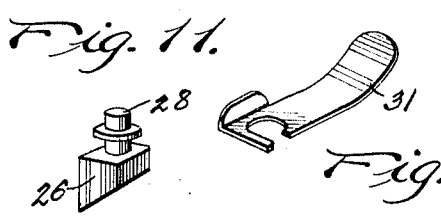
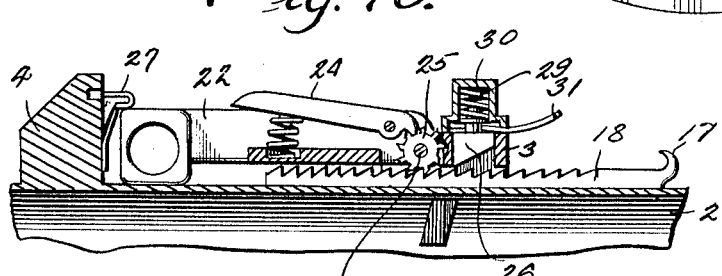
Inventor
Edward P. Jones
By Richard Bowen
Attorney

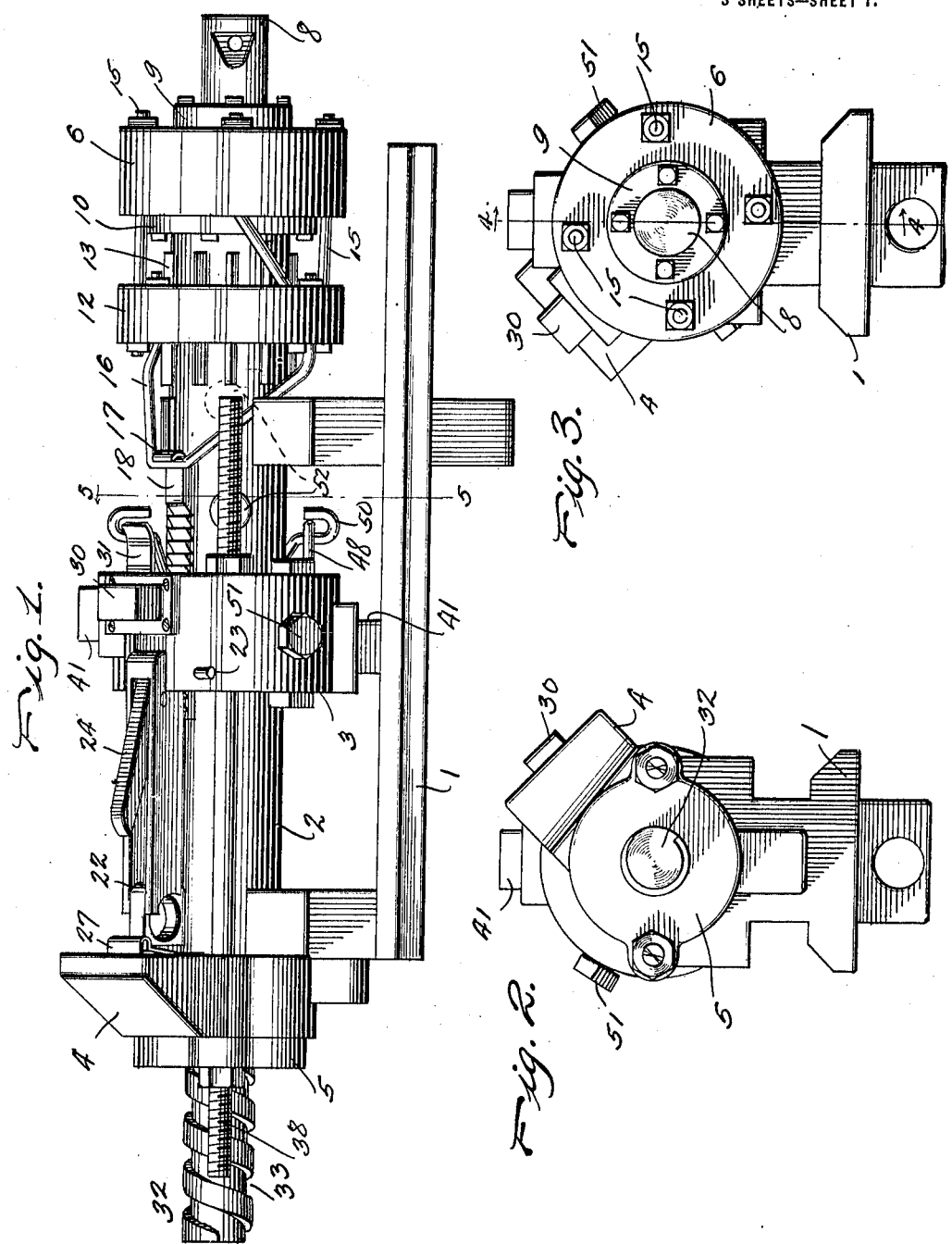

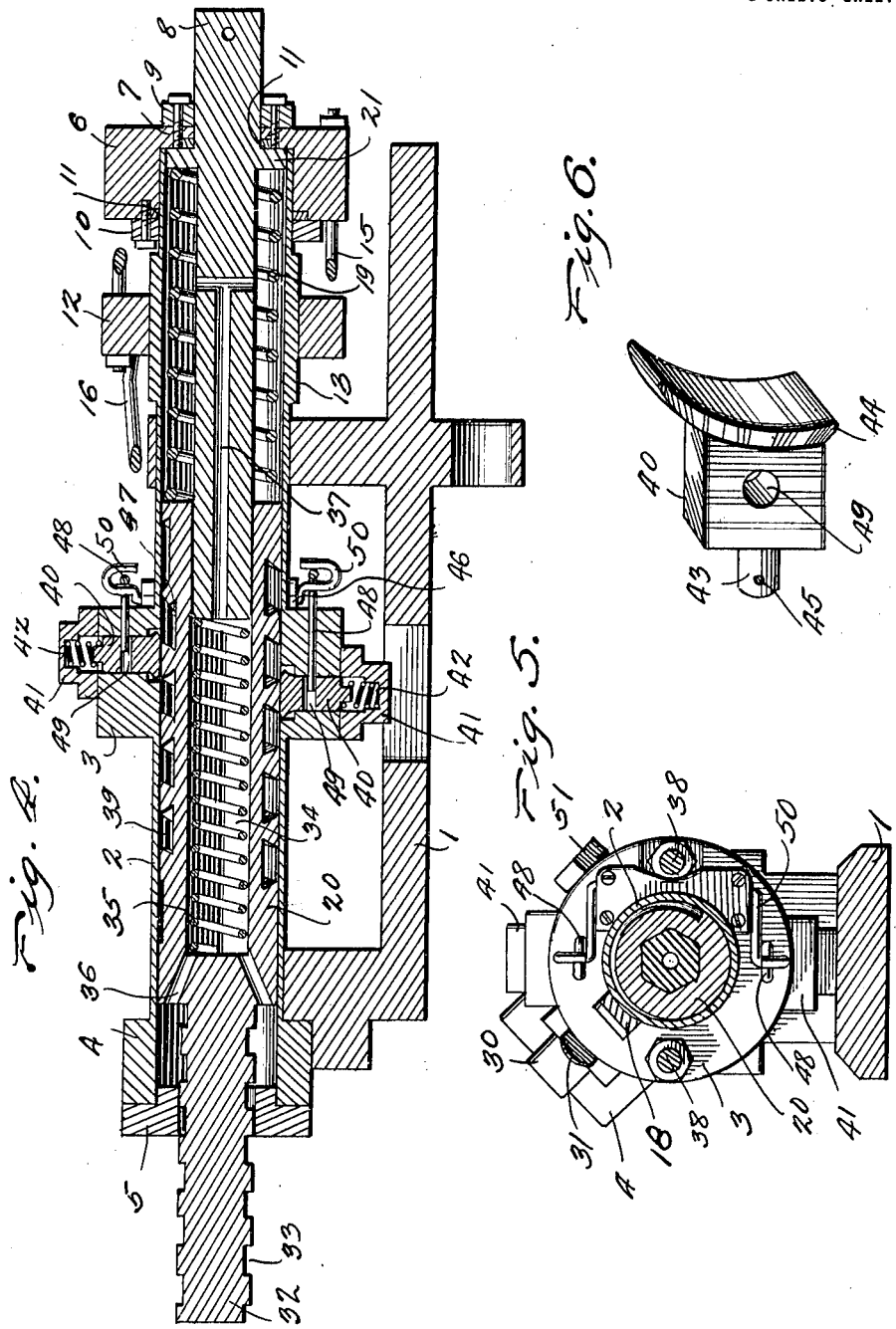

UNITED STATES PATENT OFFICE.

EDWARD P. JONES, OF BRECKENRIDGE, COLORADO.

ROCK-DRILL-OPERATING MECHANISM.

1,314,811.  Specification of Letters Patent.  Patented Sept. 2, 1919.

Application filed November 1, 1918. Serial No. 260,677.

*To all whom it may concern:*

Be it known that I, EDWARD P. JONES, a citizen of the United States, residing at Breckenridge, in the county of Summit and State of Colorado, have invented certain new and useful Improvements in Rock-Drill-Operating Mechanism, of which the following is a specification.

This invention relates to means for operating a drill for boring rock and mineral and has for its object to provide an essentially high powered mechanism which will operate a drill by a rotary motion, solely, or by a combined rotary and driving action, the mechanism embodying a hammer and operating means whereby to impart a rotary or a combined rotary and reciprocating movement thereto, the change being effected without requiring the driving means to be stopped or thrown out of action.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the accompanying drawings,

Figure 1 is a side view of a rock drill operating mechanism embodying the invention, Fig. 2 is a front end view, Fig. 3 is a rear end view, Fig. 4 is a central longitudinal section on the line 4—4 of Fig. 3 looking to the right as indicated by the arrows, Fig. 5 is a transverse section on the line 5—5 of Fig. 1 looking to the left as indicated by the arrows, Fig. 6 is a perspective view of one form of dog provided to coöperate with the hammer, Fig. 7 is a perspective view of the hammer, Fig. 8 is a perspective view of a modified form of dog adapted to coöperate with the hammer, Fig. 9 is a perspective view of part of the means for tensioning the rebounding hammer operating spring, Fig. 10 is a sectional detail showing the means for adjusting and holding the spring tensioning mechanism in the required adjusted position, Fig. 11 is a perspective view of the dog provided to coöperate with the ratchet bar of the spring tensioning means, and Fig. 12 is a perspective view of the lever provided to coöperate with the dog illustrated in Fig. 11.

Corresponding and like parts are referred to in the following description and indicated in the several views of the drawings by like reference characters.

The numeral 1 designates a shell or suitable support for receiving the drill operating mechanism which is secured thereto in any preferred way.

The drill operating mechanism comprises a body or barrel 2 which may be of any construction and relative size. An enlargement 3 is provided intermediate the ends of the barrel or body 2 and preferably consists of an integral part thereof. An enlargement 4 is formed at one end of the body 2 and a flanged rim 5 is secured thereto in any manner. A head 6 is slidably fitted on the opposite end of the body 2 and is formed with an inner extension 7 which constitutes an annular stop to prevent outward displacement of a spindle 8 to which the driving means is adapted to be coupled in a manner well understood. A ring 9 is secured to the outer face of the head 6 and has a snug fit upon the projecting end of the spindle 8. A ring 10 is secured to the inner face of the head 6 and has a close fit upon the end of the body 2. As indicated most clearly in Fig. 4 gasket or packing 11 is disposed near opposite faces of the head 6 to insure close joint with the respective parts 2 and 8.

A ring 12 is slidably mounted upon the inner or rear end of the body 2 and is prevented from turning thereon. As indicated a plurality of ribs 13 formed on the outer side of the body 2 engage corresponding grooves 14 formed in the inner side of the ring 12 thereby preventing rotary movement of the ring on the body. Rods 15 connect the ring 12 with the head 6 to cause both to move in unison. A bail 16 is connected with the ring 12 and is adapted to be engaged with a hook 17 at one end of a rack bar 18 slidably mounted on the body 2 and within an opening formed in the enlargement 3. The head 6 and adjunctive parts constitute elements of the means for varying the tension of the hammer rebounding spring 19 which is located within an end portion of the body 2 and surrounds the spindle 8 and is confined between the inner end of the hammer 20 and a shoulder 21 formed on the spindle near the outer end thereof and adapted to engage the inner extension 7 of the head 6. The head 6 has a limited longitudinal movement on the rear end of the body 2 and effects a corresponding movement of the spindle 8 thereby compressing the spring 19 to a greater or less extent as may be required.

A lever 22 is pivotally connected at its rear end to the enlargement 3 by means of a pin 23 and receives a dog 24. A pinion or toothed wheel 25 is mounted upon the pin 23 and its teeth are adapted to mesh with the teeth of the rack bar 18 and adapted to be engaged by the rear end of the dog 24. When the dog 24 is in engagement with the pinion or toothed wheel 25, as indicated in Fig. 10, and the forward end of the lever 22 is moved outward from the body 2, the pinion 25 is rotated and effects a longitudinal movement of the rack bar 18 and a corresponding movement of the head 6, thereby tensioning the spring 19. A dog 26 mounted in the enlargement 3 engages the rack bar 18 and holds the same in the adjusted position. In the normal position of the lever 22 it lies against the body 2 and is retained in position by means of a catch 27. The dog 26 has a flange stem 28 which receives a spring 29 housed by means of a cap 30 closing the radial opening formed in the enlargement 3 to receive the dog 26. A lever 31 coöperates with the dog 26 and enables the same to be moved outward when it is required to release the rack bar 18 so that it may move rearward when an outward movement of the head 6 is desired. The inner end of the lever 31 engages the flange on the stem 28 as will be readily comprehended.

The hammer 20 has an extension 32 which is formed with a spiral groove 33 and which is of less diameter than the hammer. The body of the hammer is chambered as indicated at 34 and receives a spring 35 which is adapted to supplement the action of the spring 19 in causing the rebound of the hammer. The chamber 34 extends longitudinally of the hammer and is of non-circular form in cross section to receive the inner portion of the spindle 8 which is of corresponding shape in cross section whereby the spindle and hammer are caused to turn as one part while at the same time admitting of the hammer having a longitudinal movement on the spindle to compress the springs 19 and 35 which when suddenly released causes a rebound of the hammer and an impact being delivered upon the drill or boring tool. As indicated most clearly in Figs. 5 and 7 the chamber or opening 34 is of hexagonal form in cross section, but it is obvious that the chamber may be of any non-circular outline to cause the hammer and spindle to rotate together. The spring 19 is confined between the inner end of the hammer 20 and the shoulder 21 of the spindle 8. The spring 35 is confined between the inner end of the spindle 8 and the inner end of the chamber or opening 34. Openings 36 are formed in the forward end of the hammer at the base of the reduced portion 32 whereby to make provision for ingress and egress of air and a lubricant. An opening 37 is formed in the spindle 8 and extends through the inner end of the spindle and through a side thereof and also provides for ingress and egress of a lubricant and air in the operating of a mechanism.

By having the reduced end or shank 32 of the hammer formed with the spiral groove 33 provision is had for operating the ratchet mechanism commonly provided in connection with a drill chuck, whereby a drill or boring tool may be turned at each stroke of the hammer. The pitch of the groove 33 may vary as required. The drill chuck, not shown, is adapted to be connected to the body of the mechanism by means of rods 38.

The body of the hammer 20 is formed with a spiral groove 39 the walls of which may be parallel, or oppositely inclined depending upon the particular form of the dog provided to coöperate therewith as shown in Figs. 6 and 8. Fig. 8 shows a dog having parallel sides and when a dog of this form is provided the walls of the groove 39 will be parallel. Fig. 6 shows a form of dog having its inner portion enlarged and flared and when a dog of this shape is employed as indicated in Fig. 4 the walls of the groove 39 will be outwardly converged. This form of dog may be preferred in some instances since it precludes its entrance into the groove 39 at any point between the ends of such groove. Usually two dogs are provided but it is obvious that the number may vary. The dog is indicated generally at 40 and its inner end is made concave to conform to the circumference of the hammer so as to obtain an extended bearing against the walls of the spiral groove 39. The dogs 40 are mounted in radial openings formed in the annular enlargement 3 and such openings are closed at their outer ends by means of caps 41. Springs 42 press the dogs 40 inward. Each of the dogs 40 has a projection 43 at its outer end to receive the inner end of the spring 42. The form of dog indicated most clearly in Fig. 6 and having its inner end enlarged as shown at 44 has its projection 43 formed with an opening 45 to receive a wire or other element when placing the dog in position. Referring to Fig. 4 it will be noticed that the inner ends of the radial openings provided in the enlargement 3 are enlarged to receive the extended ends 44 of the dogs 40, hence when placing such dogs in position they must be drawn into the body 2 thence outward through the radial openings formed in the enlargement 3 and this operation is effected by passing a wire or like element through a radial opening of the enlargement 3 and outwardly through the body 2, the projecting end of the wire being engaged with the opening 45 in the projection 43 of the dog. A pull upon the wire or like part draws the dogs into the body 2 hence outward to the radial opening to the enlargement 3 as will be readily comprehended.

The spiral groove 39 extends preferably in a reverse direction to the spiral groove 33 and its ends merge into the sides of the hammer at the ends thereof as indicated most clearly in Fig. 7. This construction is necessary to cause the dogs to clear the groove 39 when the hammer is at the limit of its inward movement thereby suddenly releasing the springs 19 and 35 whereby the rebound of the hammer is effected to jar or deliver a blow upon the drill or boring tool. When the hammer is at the limit of its outward stroke the dogs are about in line with the inner end of the spiral groove 39 so as to gradually enter said groove and in the rotation of the hammer cause the latter to move inward and compress the springs 19 and 35. The groove 39 widens at its ends to insure the proper coöperation of the dogs therewith. One wall of the groove 39 at the inner end thereof is beveled, as indicated at 46, the purpose being to facilitate the entrance of the dogs into the groove and this is of special advantage when the walls of the groove are undercut. The forward wall of the groove 39 near the inner or rear end thereof has a portion beveled as indicated at 47 to provide clearance to enable the dog to ride upon the inclined rib during a partial revolution of the hammer should they fail at first to enter the groove 39 so that during the next revolution of the hammer the dogs will enter the groove and perform the function of drawing the hammer into the body or barrel 2 against the tension of the rebounding springs 19 and 35. When the hammer reaches a position in its rearward travel to cause the dogs 40 to ride out of the groove 39 the rebounding spring pressure instantly comes into play and throws the hammer forward so as to deliver a blow upon the drill or boring tool and during the rebound or forward movement of the hammer the dogs clear the groove 39 and ride upon the outer edges of the spiral fin or rib formed as a result of the groove 39. It has been found that the movement of the hammer is effected so quickly that the dogs will not enter the groove even though the groove and dogs are of a like width as in the case of the sides of the dogs and the walls of the groove being parallel. To preclude any possibility of the dogs entering the groove 39 during the rebound of the hammer it is preferred to have the walls of the groove 39 outwardly converged and the inner ends of the dogs flared, as shown most clearly in Figs. 4 and 6. This results in having the outer side of the groove 39 of less width than the inner portion.

In some cases it may be desirable to dispense with the impact of the hammer upon the boring tool or drill and to impart a rotary movement of the tool solely. This is effected by restraining means for holding the dogs 40 out of the path of the spiral groove 39. This may be accomplished in a variety of ways and as shown a pin 48 is provided to coöperate with each of the dogs 40 and is mounted in the enlargement 3 and is adapted to engage an opening 49 formed into the dog. The pins 48 are adapted to be simultaneously operated and for this purpose a crank lever 50 is employed and is journaled to one side of the enlargement 3 and its cranked ends engage the projecting end of the pin 48 whereby to simultaneously operate such pins into or out of engagement with the dogs 40. When the dogs are held near the groove 39 the crank lever 50 is moved to throw the pins 48 inward so as to engage the dogs 40 and hold them in outward position as indicated in Fig. 4. In this position of the dogs the hammer is rotated simply without having any reciprocating movement imparted thereto. When the dogs 40 are released and permitted to act in their usual way they enter the inner end of the groove 39 and as the hammer is rotated cause the same to move inward against the tension of the rebounding springs. When the hammer reaches its inward travel the dogs 40 clear the outer end of the groove 39 and the hammer is projected by the rebounding action of the springs 19 and 35.

It is proposed to make provision for properly lubricating the parts and for this purpose openings are formed in the body and preferably in the enlargement 3 and such openings are closed by plugs 51. The rear portion of the body may be provided with intercommunicating valve controlled openings 32 whereby a suitable fluid medium may be supplied to the boring if desired. The driving power is adapted to be connected to the spindle 8 in any manner and a suitable drill chuck is adapted to be connected to the body by means of the rods 38.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In means for operating a rock drill or analogous boring tool, a tool operating member having a longitudinal opening extending therein from one end, a spindle slidable within the opening of the tool operating member and rotatable therewith, a spring within the opening of the tool operating member and confined between the same and the spindle and a second spring mounted on the spindle and confined between the same and the tool operating member.

2. In means for operating a rock drill or analogous boring tool, a hammer having an exterior spiral groove, a spindle having telescopic connections with the hammer and rotatable therewith, a dog in coöperative relation with the spiral groove of the hammer to impart a longitudinal movement thereto and a rebounding spring for projecting the hammer when released from the dogs.

3. In means for operating a rock drill or analogous boring tool, a spindle, a hammer having connection with the spindle to rotate therewith and move longitudinally thereon and having an exterior spiral groove, a rebounding spring and a dog in coöperative relation with the spiral groove of the hammer to move the latter longitudinally to tension the rebounding spring which latter reacts to project the hammer the instant it is released from the controlling influence of the dog.

4. In means for operating a rock drill or analogous boring tool, a spindle, a hammer having rotary and sliding connection with the spindle and provided with an external spiral groove which vanishes into the surface of the hammer at its forward end, a dog in coöperative relation with the spiral groove of the hammer and a rebounding spring for projecting the hammer.

5. In means for operating a rock drill or analogous boring tool, a spindle, a hammer having rotary and sliding connection with the spindle and provided with an external spiral groove which widens at its ends, a dog in coöperative relation with the spiral groove, and a rebounding spring for projecting the hammer.

6. In means for operating a rock drill or analogous boring tool, a spindle, a hammer having rotary and sliding connection with the spindle and provided with an external spiral groove which widens at its ends and vanishes into the side of the hammer, a dog in coöperative relation with the spiral groove and a rebounding spring for projecting the hammer.

7. In means for operating a rock drill or analogous boring tool, a spindle, a hammer having rotary and sliding connection with the spindle and provided with an external spiral groove which has the rear wall of its rearmost flight beveled, a dog in coöperative relation with the spiral groove and a rebounding spring for projecting the hammer.

8. In means for operating a rock drill or analogous boring tool, a spindle, a hammer having rotary and sliding connection with the spindle and provided with an external spiral groove the rearmost flight of which has a portion of its forward wall beveled, a dog in coöperative relation with the spiral groove and a rebounding spring for projecting the hammer.

9. In means for operating a rock drill or analogous boring tool, a spindle, a hammer having rotary and sliding connection with the spindle and provided with an external spiral groove, the rearmost flight of which has its opposite walls beveled, a dog in coöperative relation with the spiral groove and a rebounding spring for projecting the hammer.

10. In means for operating a rock drill or analogous boring tool, a spindle, a hammer having rotary and sliding connection with the spindle and provided with an external spiral groove whose ends vanish into the sides of the hammer, a dog in coöperative relation with the spiral groove and having its inner face of greater extent than the width of the spiral groove at its outer side to preclude the entrance of the dog into the groove at any point between the ends thereof and a rebounding spring for projecting the hammer.

11. In means for operating a rock drill or analogous boring tool, a spindle, a hammer having rotary and sliding connection with the spindle and provided with an external spiral groove whose ends vanish into the sides of the hammer, said groove having its walls undercut, a dog in coöperative relation with the spiral groove and having its inner face of greater extent than the width of the groove at its outer side and a rebounding spring for projecting the hammer.

12. In means for operating a rock drill or analogous boring tool, a hammer having its end portions provided with spiral grooves, the one being the reverse of the other and a dog coöperating with the spiral groove in the inner end portion of the hammer to impart a longitudinal movement thereto.

13. In means for operating a rock drill or analogous boring tool, a hammer having its outer end portion reduced and provided with a spiral groove and having its inner portion formed with a reverse spiral groove and a dog coöperating with the inner spiral groove to impart a longitudinal movement to the hammer.

14. In means for operating a rock drill or analogous boring tool, a hammer having an external spiral groove, means for imparting rotary movement to the hammer, a rebounding spring for projecting the hammer, a dog adapted to coöperate with the spiral groove of the hammer to impart a longitudinal movement to the hammer and means for holding the dog out of the path of the spiral groove to admit of the hammer rotating without having any longitudinal movement imparted thereto.

15. In means for operating a rock drill or analogous boring tool, a hammer mounted to receive a rotary and a longitudinal movement and provided with an external spiral groove, a rebounding spring for projecting the hammer, dogs coöperating with the spiral groove to impart a longitudinal movement to the hammer, restraining means adapted to engage the dogs to hold them clear of the hammer, and means for simultaneously operating the restraining means.

16. In means for operating a rock drill or analogous boring tool, a body, a hammer mounted within the body, a rebounding spring for projecting the hammer, a member mounted on the body and movable longitudinally thereon for varying the tension of the rebounding spring and means for adjusting said member and holding it in the adjusted position.

17. In means for operating a rock drill or analogous boring tool, a body, a hammer mounted within the body, a rebounding spring for projecting the hammer, a member slidably mounted on the body, a longitudinally movable element having connection with said element and means for adjusting the longitudinally movable element and holding it in the adjusted position.

18. In means for operating a rock drill or analogous boring tool, a body, a hammer disposed within the body, a rebounding spring for projecting the hammer, a head slidable on the body, a rack bar mounted on the body, connecting means between the rack bar and head, means for moving the rack bar longitudinally and means for securing the rack bar in adjusted position.

19. In means for operating a rock drill or analogous boring tool, a body, a hammer within the body, a head slidable on the body, a rebounding spring for projecting the hammer, a ring slidable on the body and prevented from turning thereon and having connection with the said head, and means for adjusting the ring and holding it in the adjusted position.

20. In means for operating a rock drill or analogous boring tool, a body, a hammer within the body, a head slidable on the body, a rebounding spring for projecting the hammer, a ring slidable on the body and prevented from turning thereon and having connection with the said head, a rack bar having connection with the ring, a pinion in mesh with the teeth of the rack bar, a lever, a dog mounted upon the lever and adapted to engage the pinion to effect adjustment of the rack bar and means coöperating with the rack bar to hold the same in adjusted position.

21. In means for operating a rock drill or analogous boring tool, a body having an annular enlargement intermediate its ends, a hammer disposed within the body and having an external spiral groove, a spindle mounted within the body and having rotary and sliding connection with the hammer, a rebounding spring between the spindle and hammer, dogs mounted in the said annular enlargement and adapted to coöperate with the sprial groove of the hammer, restraining means for holding the dogs out of action, a head slidably mounted on the body and having a portion in engagement with the spindle to move the latter inward and vary the tension of the rebounding spring, a ring mounted on the body and prevented from turning thereon and having a longitudinal movement, means connecting the ring with the head, a rack bar slidable in the said annular enlargement and having connection with the ring, a pinion in mesh with the rack bar, a lever, a dog mounted on the lever and adapted to engage a pinion to move the rack bar longitudinally and means for holding the rack bar in adjusted position.

In testimony whereof I affix my signature in presence of two witnesses.

EDWARD P. JONES.

Witnesses:
  GEORGE ROBINSON,
  JAROL WILD.

Copies of this patent may be obtained for five cents each, by addressing the "Commissioner of Patents, Washington, D. C."